June 21, 1960     W. F. KALLIS     2,941,820
FLUID COUPLING DEVICE
Filed Feb. 28, 1958                           2 Sheets-Sheet 1
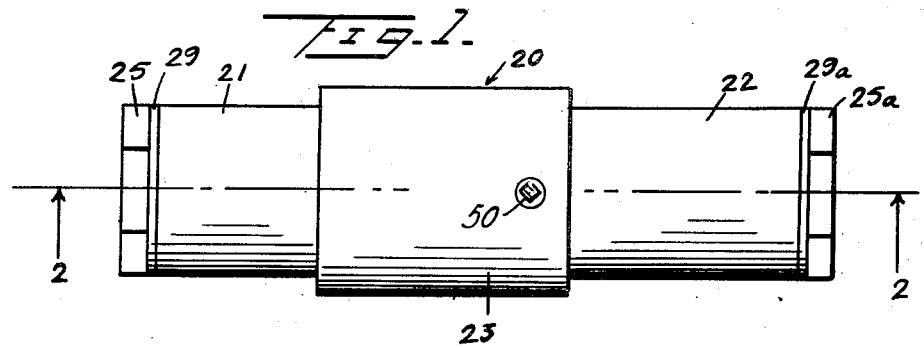
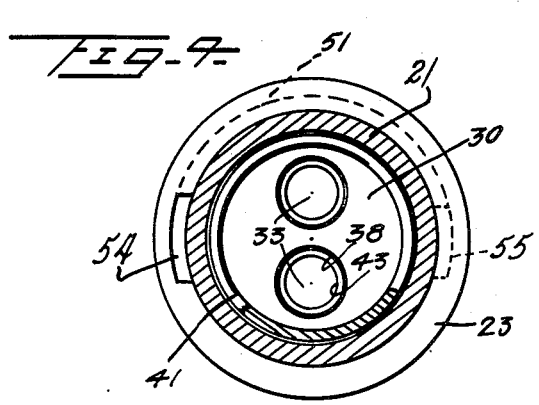
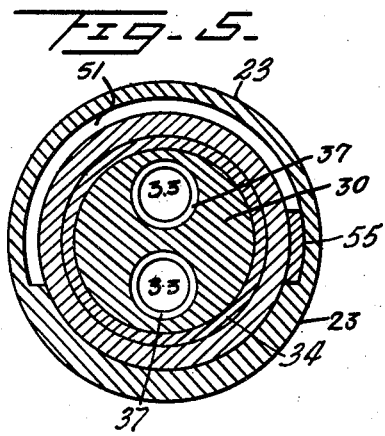
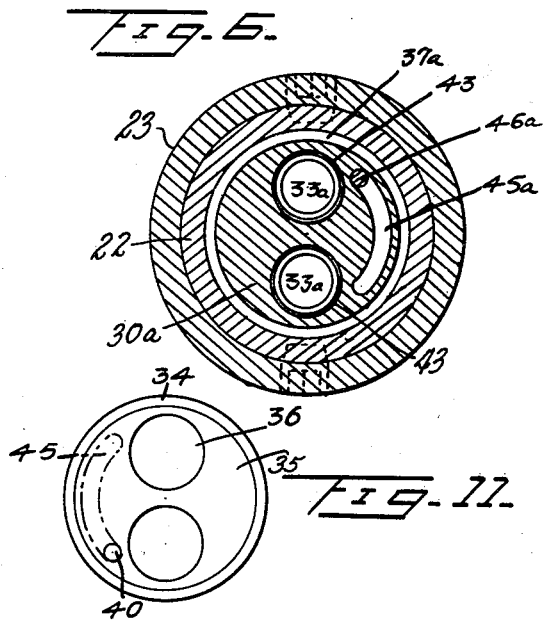
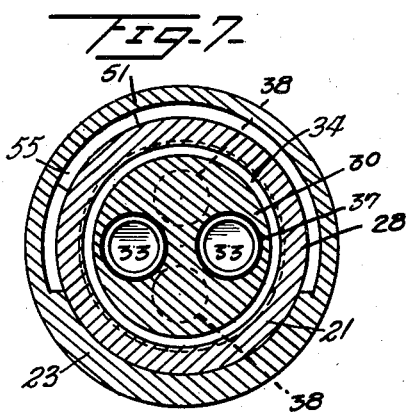
W. F. Kallis
INVENTOR
BY C. A. Snow & Co.
ATTORNEYS.

June 21, 1960  W. F. KALLIS  2,941,820
FLUID COUPLING DEVICE
Filed Feb. 28, 1958  2 Sheets-Sheet 2
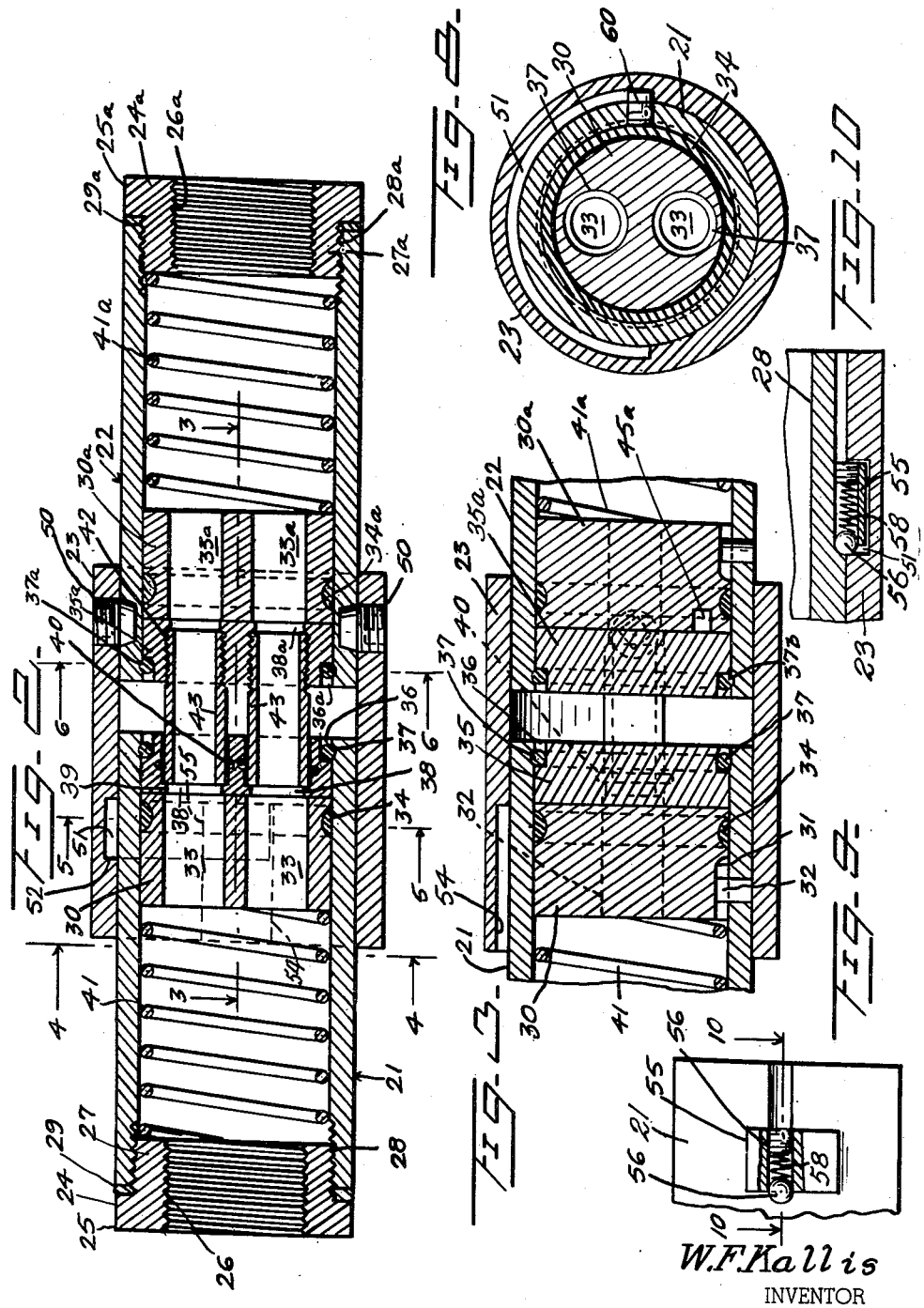
W. F. Kallis
INVENTOR
BY C. A. Snow & Co.
ATTORNEYS.

United States Patent Office 2,941,820
Patented June 21, 1960

2,941,820

FLUID COUPLING DEVICE

William F. Kallis, 2005 S. 5th W., Missoula, Mont.

Filed Feb. 28, 1958, Ser. No. 718,208

5 Claims. (Cl. 284—18)

This invention relates to a fluid coupling device and more particularly to a coupling device for fluid lines, such as a hydraulic line, hose or the like.

A primary object of this invention is the provision of an improved coupling device of this character, which may be readily connected and disconnected with a minimum of effort and difficulty.

An additional object of this invention is the provision of such a coupling device which will automatically shut off the flow of water from either or both of the two sections being disconnected, and which may be readily adjusted to cause the resumption of the flow after the connection has been again made.

A further object of the invention is the provision of a reduction coupling characterized by two communicating passageways in the ends of the intermediate fittings thereof, the areas of the passageways being such as to equal the area of the inlet and outlet openings at the opposite ends of the coupling.

Still another object of the invention is the provision of such a device which may be readily assembled and disassembled for repair, or the like.

Further objects reside in the combinations of elements, arrangements of parts, and features of construction.

Additional objects in part will be obvious and in part pointed out as the description of the invention proceeds, and shown in the accompanying drawings, wherein there is disclosed a preferred embodiment of this inventive concept.

In the drawings:

Figure 1 is a side elevational view of one form of coupling embodying features of the instant invention.

Fig. 2 is an enlarged sectional view taken substantially along the line 2—2 of Fig. 1, as viewed in the direction indicated by the arrows.

Fig. 3 is a sectional view taken substantially along the line 3—3 of Fig. 2, as viewed in the direction indicated by the arrows.

Fig. 4 is a sectional view taken substantially along the line 4—4 of Fig. 2, as viewed in the direction indicated by the arrows.

Fig. 5 is a sectional view taken substantially along the line 5—5 of Fig. 2, as viewed in the direction indicated by the arrows.

Fig. 6 is a sectional view taken substantially along the line 6—6 of Fig. 2, as viewed in the direction indicated by the arrows.

Fig. 7 is a sectional view taken substantially along the line 5—5 of Fig. 2, as viewed in the direction indicated by the arrows, but showing the parts rotated in a different position of adjustment.

Fig. 8 is a view similar to Fig. 5, but showing a modified form of the construction, and having the inner valve member removed.

Fig. 9 is a fragmentary plan view of the latching means between the inner and outer coupling sleeves.

Fig. 10 is a sectional view of the latching means taken substantially along the line 10—10 of Fig. 9, as viewed in the direction indicated by the arrows.

Fig. 11 is an end elevational view of one of the fixed valve members, which comprises the closure element for the coupling, with the outer sleeve removed.

Similar reference characters refer to similar parts throughout the several views of the drawings.

Having reference now to the drawings in detail, the device of the instant invention comprises, as best shown in Fig. 1, a coupling generally indicated at 20, including a first inner coupling sleeve 21, a second inner coupling sleeve 22, and an outer coupling sleeve 23. Having reference particularly to Fig. 2, the inner coupling sleeve 21 has mounted in the outer end a bushing 24 having a flange 25 and a bore 26, which is internally threaded and which is adapted to receive a hose or a similar fluid conduit. An internally threaded hub 27 of bushing 24 is also threaded exteriorly at 28 to receive complementary threads on the inner coupling sleeve 21. A copper sealing gasket 29, or the like, is positioned between the shoulder formed by the flange 25 and the end of the sleeve 21.

Interiorly of the sleeve 21, there is positioned a rear or inner cylindrical valve member 30, in which there is formed a groove 31, adapted to receive a pin 32, or the like (Fig. 3), which is secured in the side wall of the sleeve 21, to prevent relative rotation of the inner valve member 30. A pair of parallel bores 33 extend axially through the valve member 30. Around the exterior periphery of the fixed valve member 30, there is formed a groove, which contains the sealing gasket 34, or the like. At the inner end of the coupling sleeve 21, there is a cylindrical valve member 35, which has adjacent its outer face an annular channel 36, which contains a metallic clamping ring 37. The cylindrical valve member 35 is rotatable relative to the cylindrical valve member 30, and contains a pair of parallel bores 38, adapted, when the cylindrical valve member 35 is in one position of adjustment, to register with the bores 33 in the cylindrical valve member 30. Each bore 38 is formed with an internal shoulder 39, the bore being enlarged outwardly thereof, the purpose of the shoulder being for the reception and seating of certain tubular elements, to be hereinafter described. Interiorly of each bore 38, there is an annular groove, adapted for the reception of a rubber sealing gasket 40 or the like.

A spring 41 of the compression type is adapted to seat against the inner face of the cylindrical valve member 30 and the hub 27 on the bushing 24.

The complementary inner coupling sleeve 22 is substantially identical in most of its features to the first inner coupling sleeve 21, previously described, and receives a bushing 24a. The bushing has a flange 25a, an internally threaded bore 26a and an inwardly extending shoulder 27a adapted to engage the threads 28a in the outer end of the inner coupling sleeve 22.

The inner coupling sleeve 22 receives a fixed or inner cylindrical valve member 30a, similar to the cylindrical valve member 30, and a sealing gasket 29a is positioned between the shoulder formed by the flange 25a and the end of the sleeve 22. Within the coupling sleeve 22 there is a coiled compression spring 41a, which is positioned between the inner end of the hub 27a of the bushing 24a and the inner end of the fixed cylindrical valve member 30a. The latter is provided with bores 33a corresponding to and adapted to be aligned with the bores 33 in the cylindrical valve member 30. A rotatable cylindrical valve member 35a has a circumferential groove 36a, which receives a metallic clamping ring 37a, and inner parallel bores 38a. These bores 38a are threaded, as at 42, and accommodate the correspondingly threaded ends of the nipples 43, which extend axially beyond the outer end of the rotatable cylindrical valve member 35a, and which nipples are adapted to seat in the enlarged portions of the bores 38 in the rotatable cylindrical valve member 35 against the shoulders 39 and be received within the sealing gaskets 40, thus affording a relatively fluid-tight seal between the inner coupling sleeves 21 and 22, when the latter are connected.

The outer ends of the cylindrical valve members 30 and 30a are formed with slots 45 and 45a, respectively, which slots are adapted to receive suitable pins 46 and 46a on the inner ends of the cylindrical valve members 35 and 35a, respectively, these slots being arcuate in configuration, and of a length approximating a quarter circle, for the purpose of limiting the relative rotation of the movable cylindrical valve members 35 and 35a with respect to the fixed cylindrical valve members 30 and 30a, respectively.

The outer coupling sleeve 23 is adapted to be secured to one of the inner sleeves of the coupling. As illustrated, the outer sleeve 23 is secured to the inner sleeve 22, by means of Allen set screws 50, to prevent rotation of the outer coupling sleeve 23 relative to the inner coupling sleeve 22. Adjacent the other end of the outer sleeve 23 there is an arcuate groove 51, the side of which forms a shoulder 52, which groove extends substantially about one-half of the inner periphery of the outer sleeve 23. An axially extending groove 54 is formed in the inner wall of the outer sleeve 23, extending from the outer end of same and merging with the arcuate groove 51. On the outer surface of the inner coupling sleeve 21, there is formed a lug 55 which is adapted to enter the axial groove 54 and the arcuate groove 51, the arrangement being such that when the lug 55 is rotated to a position opposite the groove 54 through the shoulder 52, the inner coupling sleeve 21 may be removed outwardly from the outer coupling sleeve 23, to disconnect the coupling.

A ball detent 56 is positioned in the bore in the lug 55 and is spring biased outwardly, as by means of a spring 58. The ball 56 is received in a recess at the far end of the arcuate groove 51, for holding the parts in related assembly.

Fig. 8 discloses a slightly modified form of the invention wherein an Allen set screw 60 is mounted in the inner coupling sleeve 21, and serves a purpose similar to that of the lug 55.

From the foregoing the operation of the device should now be readily understood. When the coupling is locked in position with the ball detent 56 engaged at the far end of the arcuate groove 51, the parts are aligned as shown in Fig. 5, with the bores 33, the bores 38, the nipples 43 and the bores 33a in alignment, so that a free passage of fluid is provided between the two sections of the coupling. As so positioned, the engagement of the lug 55 in the arcuate groove 51 prevents disengagement of the inner and outer coupling sleeves 21 and 23.

However, when the outer coupling sleeve 23 is rotated a half turn relative to the inner coupling sleeve 21, the lug 55 becomes aligned in the arcuate groove 51 with the axially extending groove 54 and the inner coupling sleeve 21 may be pulled outwardly relative to outer coupling sleeve 23. This partial rotation of the outer coupling sleeve 23, however, moves the rotatable cylindrical valve members 30 and 30a relative to their associated fixed cylindrical valve members 35 and 35a, respectively, to the positions shown in Fig. 3, thus closing off the bores 33 relative to the bores 38, and the bores 33a relative to the bores 38a, respectively, and thereby completely closing both ends of the coupling. Therefore, no flow of fluid is possible when the two sections of the coupling are disengaged.

Obviously, when it is desired to re-connect the coupling the reverse procedure may be followed, and the inner coupling sleeves 21 and 23 may be rotated with respect to each other until the various bores are again in alignment.

From the foregoing it will now be seen that there is herein provided a fluid coupling device which accomplishes all of the objects of this invention, and others, and one which has many advantages of great practical utility and commercial importance.

As many other embodiments may be made of this inventive concept, and as many modifications may be made in the embodiments hereinbefore shown and described, it is to be understood that all matter herein is to be interpreted merely as illustrative, and not in a limiting sense.

What is claimed is:

1. In a hose coupling or the like, the combination of a first inner coupling member comprised by a sleeve, a fixed valve member having a pair of bores therethrough mounted in said sleeve, a rotatable valve member adjacent said fixed valve member, said rotatable valve member having a pair of parallel bores therethrough selectively alignable and disalignable relative to said bores in said fixed valve member, a second inner coupling member comprised by a sleeve, a fixed valve member having a part of parallel bores therethrough aligned with the pair of bores in said first mentioned fixed valve member, a rotatable valve member adjacent said last mentioned fixed valve member, said last mentioned rotatable valve member having a pair of bores therethrough selectively alignable and disalignable with said bores in said last mentioned fixed valve member, nipples fixed in and extending from said pair of bores in said last mentioned rotatable valve member, said nipples being slidably received in said bores in said first mentioned rotatable valve member and affording a fluid passage through said fixed and movable valve members, when all of said bores are in alignment, an outer coupling sleeve fixed to one of said first mentioned sleeves and rotatable relative to the other of said first mentioned sleeves, said outer coupling sleeve having an interior peripheral groove with a longitudinal extension, a lug carried by said first mentioned sleeve engageable in said groove, said lug being alignable with said extension groove for longitudinal disassembly of said coupling sleeve and said other of said first mentioned sleeves only when said bores in said rotatable valve members are disaligned with the bores in said first valve members.

2. The subject matter as claimed in claim 1, with an internally and externally threaded bushing threadedly engaging the outer ends of each of the first mentioned sleeve members.

3. The subject matter as claimed in claim 1, with an internally and externally threaded bushing threadedly engaging the outer ends of said first mentioned sleeve member, and clamping rings seated in grooves about the periphery of each rotatable valve member for securing said rotatable valve member against longitudinal displacement in their respective sleeves.

4. The subject matter as claimed in claim 1, with internally and externally threaded bushings threadedly engaging the outer ends of each first mentioned sleeve member, and springs between said bushings and their respective fixed valve members for securing said fixed valve members against longitudinal displacement in their respective sleeves.

5. A fluid coupling for connecting together two fluid conduits comprised by a first sleeve, adapted to receive one of said conduits, a first cylindrical valve member within said first sleeve fixed against relative rotation with respect to the latter, a plurality of nipples carried by said first cylindrical valve member and positioned parallel to the axis of said first sleeve, a second sleeve alignable with the first sleeve and adapted to receive the other of said conduits, a cylindrical valve member within said latter sleeve fixed against relative rotation with respect to the latter and having a plurality of bores therein parallel to the axis of the latter sleeve, a rotatable valve member within said latter sleeve positioned between said latter cylindrical valve member and the end of the sleeve and having a plurality of bores therein parallel to the axis of the sleeve adapted to respectively receive the nipples on the first cylindrical valve member, a third sleeve encompassing in part said first and second sleeves and secured to said first sleeve against relative rotation with respect to the latter, and a bayonet joint comprised by complementary members on said second and third sleeves correlated with the parallel bores in the fixed cylindrical valve member in the second sleeve so that the nipples carried by said first cylindrical valve member register with said bores when the bayonet joint is in position for locking the second and third sleeves together and are out of registration with said bores when the bayonet joint is in position for allowing disconnection of the second sleeve from the third sleeve.

References Cited in the file of this patent

UNITED STATES PATENTS

| | | |
|---|---|---|
| 2,275,477 | Sundholm | Mar. 10, 1942 |
| 2,317,827 | Townhill | Apr. 27, 1943 |
| 2,399,525 | Waag | Apr. 30, 1946 |
| 2,689,138 | Scheiwer | Sept. 14, 1954 |